(12) United States Patent
Hoeksel et al.

(10) Patent No.: US 8,777,111 B2
(45) Date of Patent: Jul. 15, 2014

(54) POWER SUPPLY FOR A CHIP CARD

(75) Inventors: Sebastiaan Hoeksel, Maastricht (NL); Najib Koraichi, Schimmert (NL); Patrick H. Waters, Redlynch Salisbury (GB)

(73) Assignee: Vodafone Holding GmbH, Dusseldorf (DE)

( * ) Notice: Subject to any disclaimer, the term of this patent is extended or adjusted under 35 U.S.C. 154(b) by 452 days.

(21) Appl. No.: 12/710,589

(22) Filed: Feb. 23, 2010

(65) Prior Publication Data

US 2010/0213262 A1 Aug. 26, 2010

(30) Foreign Application Priority Data

Feb. 25, 2009 (EP) ........................................ 9002629

(51) Int. Cl.
*G06K 19/06* (2006.01)
*G06K 7/00* (2006.01)

(52) U.S. Cl.
USPC .......................................... 235/492; 235/486

(58) Field of Classification Search
CPC ....... G06F 1/3203; G06F 1/266; G06K 19/07; G06K 19/07749; G06K 19/0701
USPC .......................................... 235/492, 380, 486
See application file for complete search history.

(56) References Cited

U.S. PATENT DOCUMENTS

| | | | |
|---|---|---|---|
| 5,499,019 A * | 3/1996 | Burgan et al. | 340/4.31 |
| 6,859,650 B1 * | 2/2005 | Ritter | 235/492 |
| 7,789,312 B2 * | 9/2010 | Rhelimi | 235/492 |
| 2002/0082992 A1 * | 6/2002 | Ritter | 705/41 |
| 2005/0284940 A1 * | 12/2005 | Enomoto et al. | 235/492 |
| 2011/0140841 A1 * | 6/2011 | Bona et al. | 235/492 |

\* cited by examiner

*Primary Examiner* — Thien T Mai
(74) *Attorney, Agent, or Firm* — International IP Law Group, PLLC

(57) ABSTRACT

There is provided a chip card that is configured to be inserted into a host device. An exemplary chip card comprises a microcontroller that includes a processor and a memory unit. The microcontroller is connected to a power terminal of the chip card for receiving power from a first power supply of the host device. The chip card also comprises a second power supply configured to at least temporarily supply power to a first component of the microcontroller.

15 Claims, 1 Drawing Sheet

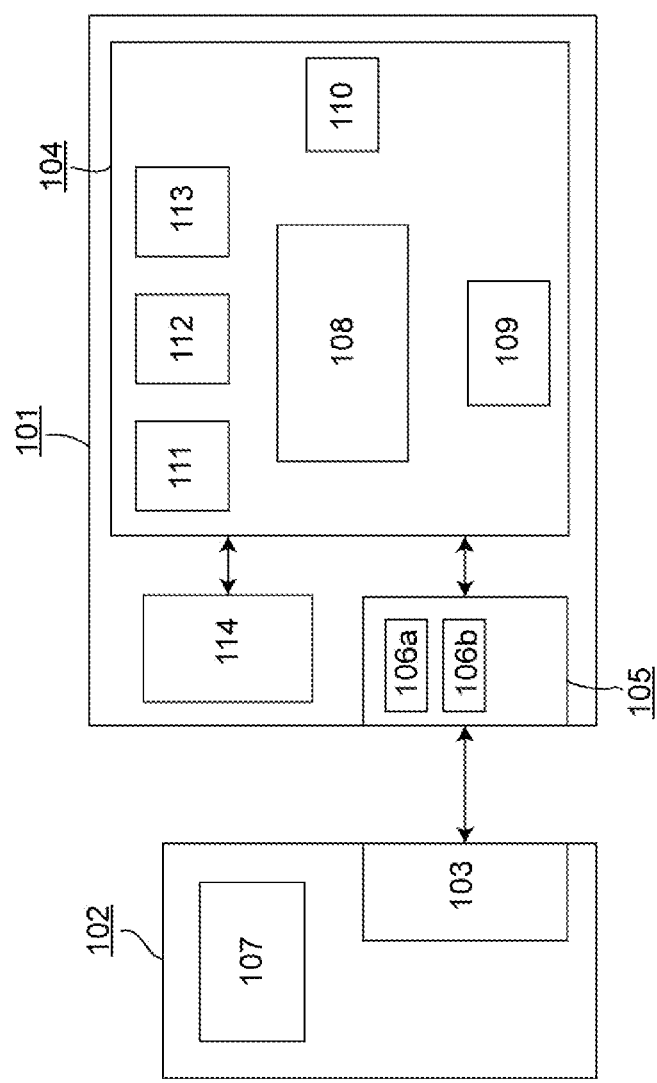

POWER SUPPLY FOR A CHIP CARD

CROSS REFERENCE TO RELATED APPLICATION

This application claims priority to European (EP) Patent Application No. 09 002 629.5-1248, filed on Feb. 25, 2009, the contents of which are incorporated by reference as if set forth in their entirety herein.

BACKGROUND

Chip cards are often used in connection with host devices to provide certain functionality to the host device. One example of such a chip card is a memory card that can be connected to the host device to increase its memory space. Another example is a so-called SIM card that is connected to a mobile communication device and provides functionality for identifying and authenticating the user of the mobile communication device to a mobile communication network.

A chip card comprises a microcontroller which is usually supplied with power from a power supply of a host device via a specific interface. According to its specification, the interface between the host device and the chip card usually allows to supply voltages of defined values to the chip card. For instance, the specification ISO 7816-3 comprises three classes corresponding to supply voltages of 5 V, 3 V and 1.8 V. Moreover, the current that can be supplied to the chip card is usually limited to predetermined values.

In particular, the microcontroller of the chip card comprises at least one processor. The performance or calculation speed of the processor, which particularly depends on the clock rate provided to the processor, determines the current that is to be supplied to the processor. For this reason, the limitation of the current that can be provided via the interface between the host device and the chip card limits the performance of the processor.

Moreover, the microcontroller usually comprises non-volatile memory units, such as electrical erasable read only memory (EEPROM) units or flash memory units. Such a memory unit can be erased and reprogrammed by supplying a programming voltage to the memory cells of the memory unit. However, the programming voltage usually exceeds voltage supplied to the chip card by the host device. Therefore, a DC to DC converter is usually integrated into the microcontroller, which provides the programming voltage of the memory units. Such DC to DC converters increase the complexity of the microcontroller and may be difficult to implement, when there is a great difference between the supply voltage and the required programming voltage of a memory unit.

SUMMARY OF THE INVENTION

An exemplary embodiment of the invention relates to power supply components of a chip card. More specifically, an exemplary embodiment may be related to a chip card for inserting into a host device. The chip card may comprise a microcontroller that includes a processor and a memory unit. The microcontroller may be connected to a power terminal of the chip card for receiving power from a first power supply of the host device.

According to one exemplary embodiment of the present invention, drawbacks of the state of the art may be avoided. Moreover, an improved power supply according to an exemplary embodiment of the present invention may comprise components of a microcontroller of a chip card, such as a processor or a memory unit.

According to one exemplary embodiment, a chip card for inserting into a host device is provided. The chip card comprises a microcontroller including a processor and a memory unit. The microcontroller may be connected to a power terminal of the chip card for receiving power from a first power supply of the host device. Furthermore, an exemplary chip card comprises a second power supply that is configured to at least temporarily supply power to a first component of the microcontroller.

An exemplary embodiment of the invention may provide a second power supply, which is integrated into the chip card. The second power supply may comprise a power source adapted to supply power to at least one component of the microcontroller. The second power supply may advantageously be independent of the first power supply of the host device. In particular the power source can supply higher voltage and/or higher current to the component than it can be supplied via the power terminal. Via the second power supply, an adapted power supply of the component can be achieved. In particular, the component may be supplied by the second power supply with a voltage that differs from the external supply voltage provided by the host device. Furthermore, the second power supply allows for at least temporarily supplying a high current to the component independent of the interface between the chip card and the host device. Thus, relatively high currents can be provided without violating the current limits of the interface between the chip card and the host device.

While the first component may be supplied with power by the second power supply, further components of the microcontroller can preferably be supplied with power via the power terminal at the same time. Thus, specific components of the microcontroller can be supplied with power by the second power supply, and, at the same time, further components can be operated in their normal mode of operation in which they are supplied with power by the external power supply provided by the host device. This also means that an adoption of these components to a modified power supply is not necessary. Furthermore, power of the second power supply may be conserved, when it supplies power only to specific components of the microcontroller.

The first component is preferably disconnected from the power terminal, while it is supplied with power by the second power supply. In particular, this avoids the inclusion of two power sources in the power supply circuit of the component.

In one exemplary embodiment of the invention, the first component can be operated in a first and in a second operation mode. In the first operation mode, the first component may be supplied with power via the power terminal. In the second operation mode, the first component may be supplied with power by the second power supply. It is an advantage of this exemplary embodiment that power supply of the component can be switched temporarily to a power supply by the second power supply. In particular, this likewise conserves power of the second power supply.

The first component may be a main processor and/or a coprocessor of the microcontroller. When such a processor is supplied with power by the second power supply, an increased current may be supplied to the processor allowing for increasing the performance of the processor. In particular, the coprocessor may be a cryptographic coprocessor. Such coprocessors are integrated into the microcontroller to execute cryptographic algorithms, which are often very complex and require many processor cycles. Consequently, it may be advantageous to increase the performance of a cryptographic coprocessor.

In order to increase the calculation speed of the processor, in the second operation mode the processor may be operated at an increased clock rate and/or at an increased voltage relative to the first operation mode. Preferably, the increased voltage corresponds to the voltage provided by the second power supply. Thus, no voltage conversion is required.

In one exemplary embodiment of the invention, the processor may be operated in the second operation mode, when it is determined that a predetermined process is executed in the processor. This allows restricting the second operation mode to predetermined processes, which may be especially complex processes requiring high computation power. Thus, such processes can be executed in short time, while less complex processes are executed in the first operation mode of the processor, thereby conserving power of the second power supply.

In one exemplary embodiment of the invention, at least one processor of the microcontroller may be exclusively supplied with power by the second power supply. It is an advantage of this exemplary embodiment, that high voltages and/or high currents can be supplied to the processor for each operation independent of the external power supply of the chip card by the host device. In particular, the second power supply may be adapted to supply a first voltage to the processor in its normal mode of operation, the first voltage differing from the voltage supplied to the chip card by the host device. In particular, the first voltage may exceed the voltage supplied to the chip card by first power supply of the host device. Preferably, in this exemplary embodiment, the processor is the coprocessor of the microcontroller which may predominantly execute complex processes, such as, for example, cryptographic calculations.

In a further exemplary embodiment of the invention, the first electronic component is a memory unit of a first type, the second power supply being adapted to provide a programming voltage for erasing and/or storing information in the memory unit. As described before, the programming voltage for memory units, such as EEPROM and flash memory, usually exceeds the external supply voltage of the chip card. Using the second power supply, an adapted voltage can be provided without voltage conversion. Alternatively, the second power supply may provide a voltage that is closer to the programming voltage than the external supply voltage such that the required voltage difference is lower, when a voltage conversion is performed. This simplifies the voltage conversion.

In one exemplary embodiment of the invention, the microcontroller comprises at least two memory units of different types having different programming voltages. The second power supply may be adapted to provide power for erasing and/or or storing information in the memory units. Preferably, in this configuration, the second power supply may be adapted to provide a voltage corresponding to the programming voltage of a first memory unit of the memory units. This allows operating to memory units, while no more than one DC to DC converter is required.

The first memory unit may be the one requiring the lowest programming voltage. In this case, the programming voltage of the other memory unit may be generated from the voltage provided by the second power supply using a DC to DC converter. Alternatively, the first memory unit may be the one requiring the highest programming voltage. In this case, the second memory unit may also be operated using the higher voltage provided by the second power supply, or a DC to DC converter may be used to generate the lower programming voltage from the voltage provided by the second power supply.

In a further exemplary embodiment of the invention, the second power supply comprises a battery. In particular, the second power supply may comprise a rechargeable battery that can be charged by supplying power to the battery via the power terminal. It is an advantage of this exemplary embodiment that second power supply can be recharged using the power supply of the host device and does not have to be replaced in case of exhaustion.

A device according to an exemplary embodiment of the invention comprises a chip card of the aforementioned type. Such an exemplary device may further comprise a first power supply that is configured to supply power to the power terminal of the chip card.

In one exemplary embodiment of the invention, the chip card is a SIM card. The host device may be a mobile communication device, which can be used together with the SIM card. The term SIM card as used herein refers to a chip card used in connection with a mobile communication device that offers identification and/or authentication services to a mobile communication network. The chip card may comprise a Subscriber Identity Module (SIM) application according to the Global System for Mobile Communications (GSM) standard, a Universal Subscriber Identity Module (USIM) application according to the Universal Mobile Telecommunications System (UMTS) standard or a corresponding application providing authentication and/or identification functions in connection with a mobile communication network.

BRIEF DESCRIPTION OF THE DRAWING

Reference will be made by way of example to the accompanying drawings in which

FIG. 1 is a block diagram showing a chip card that can be connected to a host device, according to an exemplary embodiment of the present invention.

DETAILED DESCRIPTION OF SPECIFIC EMBODIMENTS

FIG. 1 schematically depicts a chip card 101 that is provided for use in connection with a host device 102 of a user. The chip card 101 is configured according to a standard chip card format and can be inserted into a card reader unit 103 of the host device 102 configured to receive chip cards 101 of the respective standard format.

In one exemplary embodiment, the host device 102 is configured as a mobile communication device, which may be configured as a cellular phone, a Personal Data Assistant (PDA) or the like. Using a radio module, which is not shown in FIG. 1, the mobile communication device can be connected wirelessly to a mobile communication network. For instance, the mobile communication network may be a GSM or a UMTS network. In this exemplary embodiment, the chip card 101 may be used in connection with the utilization of a host device 102 in the mobile communication network. In particular, the chip card 101 may comprise an application, which provides secure identification and authentication services to the mobile communication network. If the mobile communication network is a GSM network, the chip card 101 is configured as a SIM card according to the GSM standard comprising a SIM application providing the identification and authentication services. If the mobile communication network is a UMTS network, the chip card 101 is configured as a Universal Integrated Circuit Card (UICC) comprising a USIM application providing the identification and authentication services to the mobile communication network. However, the chip card 101 may comprise another corresponding applications providing authentication and/or identification functions in connection with a mobile communication network.

The chip card 101 comprises a microcontroller 104 that is integrated into the body of the chip card 101. The microcontroller 104 is connected to an electric contact interface 105, which is preferably arranged on the surface of body of the chip card 101. The contact interface 105 comprises at least two contact elements or contact pads 106*a,b* for supplying power to the microcontroller 104. One contact element 106*a*, which is referred to as power terminal hereinafter, may be supplied with an external supply voltage, and the other contact element 106*b* may be a ground terminal.

Further contact elements or contact pads, which are not shown in FIG. 1, may be provided for exchanging data between the microcontroller 104 and the host device 102 and for receiving control signals from the host device 102. In particular, the electric contact interface 105 may be configured according to the specification ISO 7816-2. In this exemplary embodiment, the electric contact interface 105 comprises eight contact elements usually referred to as C1 to C8. The contact element C1, which is usually designated Vcc, is used for the power supply of the chip card 101 and thus corresponds to the contact element 106*a*. The contact element C2 is used for providing a reset signal to the microcontroller 104 and the contact element C3 is used for providing a clock signal to the microcontroller 104. The contact element C5 is the ground terminal and, thus, corresponds to the contact element 106*b*. The contact element C7 is an Input/Output terminal for a data exchange between the chip card 101 and the host device 102. The contact elements C4, C6 and C8 are unused according to ISO specification 7816.

When the chip card 101 is inserted into the card reader unit 103 of the host device 102, the contact interface 105 is contacted by a corresponding contact interface of the card reader unit 103, thereby establishing a power connection and a data connection between the host device 102 and the chip card 101. For providing power to the chip card 101, the power terminal 106*a* is connected to a power supply unit 107 of the host device 102 via the card reader unit 103. The power supply unit 107 may comprise a battery or may have a connection to a power network, for example. Via the card reader unit 103 a supply voltage having a predetermined value is supplied to the power terminal 106*a*. In one embodiment, the supply voltage has a value that corresponds to one class specified in the ISO specification 7816-3. According to this specification, three classes are provided: Class A provides a supply voltage of 5 V, class B provides a supply voltage of 3 V, and class C corresponds to a supply voltage of 1.8 V. The allowed voltage tolerance is 10% in each class. In further embodiments, the microcontroller 104 is operated at another supply voltage, which may particularly be a lower voltage. This is especially advantageous, if the power supply unit 107 of the host device 102 provides a lower voltage so that no voltage conversion is required for supplying the microcontroller 104 with power. The supply current of the microcontroller 104 is likewise received via the power terminal 106*a* and is limited to a predetermined value according to the specification of the chip card 101 or the specification of the interface between the chip card 101 and the host device 102.

The microcontroller 104 includes a primary or main processor (CPU) 108 for executing programs controlling functions of the chip card 101. In different exemplary embodiments, the main processor 108 may be an 8-bit, 16-bit or 32-bit processor configured according to a processor architecture known to a person skilled in the art. The main processor 108 is operated using an operating system allowing executing further applications dedicated to specific functionalities of the chip card 101.

Optionally, the main processor 108 may be supplemented by a coprocessor 109, which is configured to execute predetermined operations in lieu of the main processor 108. In one exemplary embodiment, the coprocessor 109 is a cryptographic coprocessor which is configured to execute cryptographic operations, such as encryption and decryption of data and related processes. In particular, the coprocessor 109 may be configured to execute a symmetric cryptographic algorithm, such as, for example, DES, Triple-DES or AES (DES: Data Encryption Standard; AES: Advanced Encryption Standard), or it may be configured to execute an asymmetric cryptographic algorithm, such as, for example, the RSA algorithm or an algorithm based on an elliptic curve. It is likewise possible that the chip card 101 disposes of several coprocessors 109, which may be one coprocessor 109 for symmetric cryptographic algorithms and one coprocessor 109 for asymmetric cryptographic algorithms.

A clock rate for the operation of the main processor 108 or the coprocessor 109 may be provided to the microcontroller 104 by the host device 102 via the contact interface 105. If the contact interface 105 is configured according to the specification ISO 7816-2, the contact element C5 is used to supply a clock signal from the host device 102 to the microcontroller 104. However, in exemplary embodiments of the invention, the clock rate for the main processor 108 and/or the coprocessor 109 may differ from the externally supplied clock rate permanently or temporarily, particularly the main processor 108 and/or the coprocessor may be operated at a higher clock rate permanently temporarily. This may be achieved by statically or dynamically modifying in the microcontroller 104. As an alternative, an internal clock signal, which may also be dynamically alterable, may be generated that replaces the external clock signal permanently or temporarily Further on, the microcontroller 104 comprises a volatile memory 110, which may be configured as random access memory (RAM) and which is used for storing and manipulating data during the executing of operations in the microcontroller 104. In addition, the microcontroller 104 comprises non-volatile memory. The non volatile memory may include a first memory unit 111, which may be configured as read only memory (ROM). The first memory unit 111 includes data, which are stored therein at the time of manufacture of the chip card 101, such as routines of the operating system of the chip card 101.

A further non-volatile memory unit 112 is provided, which allows for reading and writing data. The memory unit 112 may be used for storing data, such as, for example, applications executed in the microcontroller 104, and it may be configured as electrical erasable read only memory (EEPROM). In addition or in the alternative to the EEPROM 112, the microcontroller 104 may comprise a second non-volatile memory unit 113 allowing reading and writing access. This memory unit 113 may be configured as flash memory (as usual, the EEPROM 112 is to be understood as being a non-flash EEPROM). Both the EEPROM 112 and the flash memory 113 comprise a plurality of memory cells including a semiconductor element. The cells can be electrically erased and reprogrammed by applying a programming voltage to the cells. Usually, the programming voltage is approximately 17 V for EEPROM cells and 12 V for flash memory cells. Thus, when the EEPROM 112 and/or the flash memory 113 is operated using the external power supply of the chip card 101 providing a lower voltage, a DC to DC converter, such as a charge pump or a boost converter, has to be integrated into the microcontroller 104 in order to provide the required programming voltage.

In addition to the microcontroller 104, the chip card 101 comprises a power supply unit 114. Preferably, the power supply unit 114 is integrated into the body of the chip card 101 together with the microcontroller 104 without enlarging the dimensions of the chip card 101, which are determined by the respective standard format. The power supply unit 114 may be a rechargeable battery comprising one or more battery cells. The battery is small and thin enough to be integrated into the body of the chip card 101. For instance, the power supply unit 114 may be a foil battery, a RHISS battery (RHISS: rechargeable hydrogen ion solid state) or a thin-film battery. These types of batteries and their integration into the chip cards 101 are, in general, known to person skilled in the art and will thus not be described in greater detail here.

In one exemplary embodiment of the invention, the power supply unit 114 is used to supply power to the main processor 108 and/or to the coprocessor 109, while the relevant processor 108; 109 is operated with increased performance, i.e. with an increased calculation speed. Here, the internal power supply unit 114 is adapted to provide a higher power to the main processor 108 and/or the coprocessor 109. This means that the internal power supply unit 114 provides a higher current and/or a higher voltage than it is provided by the host device 101 via the power terminal 106a.

Performance of the main processor 108 may be increased temporarily, when predetermined processes are to be executed which require a higher calculation speed and/or short calculation time. For this purpose, the microcontroller 104 may be operable in one normal operation mode providing normal performance and in one special mode providing increased performance. Alternatively, several special modes may be provided, each corresponding to a predetermined operation mode offering increased calculation speed. The different modes of operation may be controlled by a control unit of the microcontroller 104, which may be a separate application executed in the main processor 108. The control unit monitors the processes executed in the main processor 108 and activates a special mode, when it determines that a predetermined application or a predetermined process within an application is to be executed in the main processor 108. The relevant applications or processes, which are intended to be executed in a special mode, may be stored in the microcontroller 104 in a list, which is accessed by the control unit to identify these applications. As an alternative, an application requiring increased calculation speed comprises a control unit, which is configured to activate the special operation mode, when the application is started or when a predetermined process within the application is started. When the application or process, which is to be executed in the special mode, has been completed, the special mode is deactivated and the normal mode is activated again.

In addition to the main processor 108 or in the alternative, the coprocessor 109 may be operable temporarily in one or more special operation modes providing increased calculation speed. As for the main processor 108, the special operation mode may be activated, when predetermined processes are to be executed. For this purpose, a control unit may be assigned to the coprocessor 109, which is configured to activate a special operation mode and which may be implemented as a separate application executed in the coprocessor 109 or in the main processor 108. The control unit again monitors the processes executed in the coprocessor 109 and activates a special mode, when it determines that a predetermined application or a predetermined process within an application is to be executed in the coprocessor 109. The relevant applications or processes, which are intended to be executed in a special mode, may be stored in the microcontroller 104 in a list, which is used by the control unit to identify these applications. As an alternative, an application requiring increased calculation speed comprises a control unit, which is configured to activate the special operation mode of the coprocessor 109, when the application is started or when a predetermined process within the application is started. When the application or process, which is to be executed in the special mode, has been completed, the special mode is deactivated and the normal mode is activated again.

In the normal operation mode, the main processor 108 and the coprocessor 109 are supplied with power via the power terminal 106a, an they are operated at a fixed clock rate, which is given by the external clock signal, derived from the external clock rate within in the microcontroller 104 or generated in the microcontroller 104. Alternatively, the clock rate may be dynamically alterable in a manner known to a person skilled in the art, in order to conserve power. In particular, the clock rate may be decreased, when a processor 108; 109 operates at low load. The main processor 108 and the coprocessor 109 may be operated at the same clock rate or at different clock rates.

In a special mode, the main processor 108 or the coprocessor 109 is supplied with power by the internal power supply unit 114 of the chip card 101. The power connection to the host device 102 via the power terminal 106a is preferably disconnected, when the relevant processor 108; 109 is supplied with power by the power supply unit 114. Consequently, activating a special mode comprises switching the power supply of the relevant processor 108; 109 from a power supply via the power terminal 106a to a power supply by the power supply unit 114. When the special mode is deactivated, the power supply is switched back to a power supply via the power terminal 106a.

The calculation speed may be increased by increasing the clock rate of the relevant processor 108; 109 relative to the fixed clock rate or the maximum clock rate used in the normal operation mode. The increased clock rate may be generated by multiplying the clock rate provided with the external clock signal, or a further clock signal corresponding to the increased clock rate may be generated in the microcontroller 104, which replaces the clock signal used in the normal operation mode. For instance, the increased clock rate may be generated using a phase-locked loop (PLL) or an internal RC oscillator of the microcontroller 104. When the special mode is deactivated, the clock rate is switched back to the clock rate used in the normal operation mode.

The voltage supplied to the relevant processor 108, 109 by the power supply unit 114 may correspond to the supply voltage provided by the host device 102. This means that the power supply unit 114 may be configured such that it provides a voltage corresponding to one specified voltage class, particularly to the voltage class of the host device 102. Here, the power supply unit 114 ensures that a supply current can be supplied to the processor 108; 109, which is high enough to operate the processor 108; 109 at the increased clock rate.

However, in addition or as an alternative to the increase of the clock rate, the calculation speed of the relevant processor 108; 109 may also be increased by supplying an increased voltage to the processor 108, 109. This technique for increasing computing performance is also known as overvolting. Preferably, the increased voltage corresponds to the voltage provided by the power supply unit 114, which consequently exceeds the supply voltage provided by the host device 102 in this exemplary embodiment.

While the main processor 108 is preferably only temporarily operated in a special mode, one exemplary embodiment of the invention provides that the coprocessor 109 is exclusively operated in accordance with a special mode described before. In this embodiment, the coprocessor 109 may be permanently supplied with power by the internal power supply unit 114 of the chip card 101, when the microcontroller 104 is turned on. Preferably, a power connection between the coprocessor 109 and the external power supply or the power terminal 106a is not provided in this embodiment. Here, the power supply unit 114 is adapted to the coprocessor 109 such that a suitable supply voltage is supplied to the coprocessor 109, which may be higher than the supply voltage provided to the chip card 101 by the host device 102. The clock rate is adjusted in such a way that a high performance, particularly a high calculation speed of the coprocessor 109 is achieved. The clock rate may be fixed or it may be dynamically alterable according to known frequency scaling techniques in order to conserve power. In particular, the clock rate may be decreased, when the coprocessor 109 operated at low load. When the coprocessor 109 is supplied with power exclusively by the power supply unit 114, it can be ensured that a sufficiently high current can be provided to the coprocessor 109. Moreover, the coprocessor 109 can be operated at an increased voltage without having to transform the external supply voltage.

In a further exemplary embodiment, the internal power supply unit 114 of the chip card 101 is used to provide the programming voltage for operating the EEPROM 112 and/or the flash memory 113.

When the programming voltage is provided for only one memory unit 112; 113, the power supply unit 114 is preferably adapted to provide a voltage that corresponds to the programming voltage of the relevant memory unit 112; 113. In this case, no voltage transformation is necessary for providing the programming voltage of the memory unit 112, 113. As an alternative, the power supply unit 114 may provide a voltage below the programming voltage, but preferably above the external supply voltage of the chip card 101. In this exemplary embodiment, a voltage conversion is necessary, but the voltage difference is decreased compared to a generation of the programming voltage from the external supply voltage. Thus, the required DC to DC converter can be dimensioned smaller.

Likewise, it is possible to provide the programming voltage for the EEPROM 112 and the flash memory 113 by the power supply unit 114. In this exemplary embodiment, the power supply unit 114 is preferably adapted to provide a voltage that corresponds to the minimal programming voltage of the required programming voltages of the memory units 112; 113, i.e. to the programming voltage of the flash memory 113. Thus, the power supply unit 114 directly provides the programming voltage of the flash memory 113. To the EEPROM 112 a DC to DC converter, particularly a charge pump or a boost converter, may be assigned, which transforms the voltage provided by the power supply unit 114 to the higher programming voltage of the EEPROM 112.

Alternatively, the power supply unit 114 is adapted to provide a voltage that corresponds to the maximum programming voltage required by the memory units 112; 113, i.e. to the programming voltage of the EEPROM 112. Thus, the power supply unit 114 directly provides the programming voltage of the EEPROM 112. The voltage provided by power supply unit 114 may also be used as programming voltage for the other memory unit 113, i.e. the flash memory 113. However, the increased programming voltage of the flash memory 113 may give rise to an increased programming current heating the flash memory 113. This can be avoided by assigning a DC to DC converter to the flash memory 113, particularly a buck converter, which transforms the voltage provided by the power supply unit 114 to the lower programming voltage of the flash memory 113.

In further exemplary embodiments, the power supply unit 114 may provide a voltage that does not correspond to the programming voltage of a memory unit 112; 113, but preferably lies between the external supply voltage of the chip card 101 and the maximum programming voltage. If the voltage lies below the minimum programming voltage, a DC to DC converter, particularly a boost converter or a charge pump, is assigned to each memory unit 112; 113, which transform the voltage provided by the power supply unit 114 to the programming voltage of the relevant memory unit 112; 113. If the voltage lies between the programming voltages of the memory units 112, 113, the voltage provided by the power supply unit 114 may be used as programming voltage for the memory unit 112; 113 requiring the lower programming voltage, i.e. the flash memory 113, and a DC to DC converter may generate the programming voltage for the other memory unit 112, i.e. the EEPROM 112, from the voltage provided by the power supply unit 114.

Preferably, the power supply unit 114 can be charged by connecting it to the power terminal 106a of the chip card 101, while the chip card 101 is supplied with power by the host device 102. The charging may preferably be controlled by a power management unit of the microcontroller 104, which may comprise a corresponding application executed in the main processor 108 or in another computing unit of the microcontroller 104. The power management unit may preferably dispose of a mechanism to determine the state-of-charge of the power supply unit 114. If it is judged that the capacity of the power supply unit 114 is below a predetermined threshold, charging is done, when it is determined that the chip card 101 is supplied with power by the host device 102 and, preferably when the microcontroller 104 operates at low load. In the latter case, the supply current of the microcontroller 108 is lower, and it is ensured that the current supplied to the chip card 101 does not exceed a given threshold due to the charging current. If the coprocessor 109 is supplied with power exclusively by the power supply unit 114, charging may preferably be done, when the coprocessor 109, which is usually operated intermittently, does not execute a calculation.

While the invention has been illustrated and described in detail in the drawings and foregoing description, such illustration and description are to be considered illustrative or exemplary and not restrictive; the invention is not limited to the disclosed embodiments.

In particular, exemplary embodiments of the invention are not limited to host devices 102 configured as mobile communication devices and to chip cards 101 configured as SIM cards. Rather, exemplary embodiments of the invention may be implemented in connection with arbitrary host devices 102 and chip cards 101.

Further on, different exemplary embodiments described herein may be combined. Consequently, one power supply unit 114 may be used to at least temporarily supply power to a processor 108; 109 and to one or more memory units 112, 113. Likewise, a chip card 101 may be equipped with several power supply units 114 each being adapted to at least temporarily supply power to one or more predetermined components of the microcontroller 104. For instance, one power supply unit 114 may be provided for supplying power to the main processor 108 and/or to the coprocessor 109, and a second power supply unit 114 may be provided for supplying power to one or more memory units 112, 113. Likewise, to each memory unit 112, 113 an internal power supply unit 114 of the chip card 101 can be assigned that provides the programming voltage for the relevant memory unit 112, 113.

Other variations to the disclosed exemplary embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

What is claimed is:

1. A chip card that is configured to be inserted into a host device, the chip card comprising:
    a microcontroller that includes a processor and a memory unit, the microcontroller being connected to a power terminal of the chip card for receiving power from a first power supply of the host device; and
    a second power supply configured to at least temporarily supply power to the processor of the microcontroller, the second power supply being adapted to supply a higher voltage or current to the processor in comparison to a voltage or current supplied via the power terminal from the first power supply during normal mode of operation of the processor in case the chip card is contacted with the host device in which the first power supply provides a nominal voltage of the first power supply.

2. The chip card recited in claim 1, wherein further components of the microcontroller can be supplied with power via the power terminal, while the processor is supplied with power by the second power supply.

3. The chip card recited in claim 1, wherein the processor can be operated in a first and in a second operation mode, in the first operation mode, the processor being supplied with power via the power terminal and, in the second operation mode, the processor being supplied with power by the second power supply.

4. The chip card recited in claim 3, wherein, in the second operation mode, the processor is operated at an increased clock rate or at an increased voltage relative to the first operation mode.

5. The chip card recited in claim 4, wherein the increased voltage corresponds to the voltage provided by the second power supply.

6. The chip card recited in claim 3, wherein the processor is operated in the second operation mode, when it is determined that a predetermined process is executed in the processor.

7. The chip card recited in claim 1, wherein at least one processor of the microcontroller is exclusively supplied with power by the second power supply.

8. The chip card recited in claim 1, the second power supply being adapted to provide a programming voltage for erasing or storing information in a memory unit of a first type.

9. The chip card recited in claim 1, wherein the microcontroller comprises at least two memory units of different types having different programming voltages, wherein the second power supply providing power for erasing and/or or storing information in the memory units.

10. The chip card recited in claim 9, wherein the second power supply is adapted to provide a voltage corresponding to the programming voltage of a first memory unit of the memory units.

11. The chip card recited in claim 1, wherein the second power supply comprises a rechargeable battery that can be charged by supplying power to the battery via the power terminal.

12. The chip card recited in claim 1, wherein the chip card comprises a SIM card.

13. A chip card system, comprising:
    a chip card that is configured to be inserted into a host device, the chip card comprising:
    a microcontroller that includes a processor and a memory unit, the microcontroller being connected to a power terminal of the chip card for receiving power from a first power supply of the host device;
    a first power supply configured to supply power to the power terminal of the chip card; and
    a second power supply configured to at least temporarily supply power to the processor of the microcontroller; the second power supply being adapted to supply a higher voltage or current to the processor in comparison to a voltage or current supplied via the power terminal from the first power supply during normal mode of operation of the processor in case the chip card is contacted with the host device in which the first power supply provides a nominal voltage of the first power supply.

14. The chip card system recited in claim 13, wherein the chip card system comprises a portion of a mobile communication device and the chip card comprises a SIM card.

15. A method, comprising:
    enabling a chip card that is configured to be inserted into a host device, the chip card comprising a microcontroller that includes a processor and a memory unit, the microcontroller being connected to a power terminal of the chip card;
    receiving power from a first power supply of the host device via the power terminal; and
    supplying power, at least temporarily, to the processor of the microcontroller via a second power supply, the second power supply being adapted to supply a higher voltage or current to the processor in comparison to a voltage or current supplied via the power terminal from the first power supply during normal mode of operation of the processor in case the chip card is contacted with the host device in which the first power supply provides a nominal voltage of the first power supply.

* * * * *